United States Patent [19]

Shiga

[11] Patent Number: 5,426,782
[45] Date of Patent: Jun. 20, 1995

[54] DATABASE SYSTEM WITH CONTROL FOR LOADING DEFINITION DATA FOR STORAGE UNITS

[75] Inventor: Shoji Shiga, Tokyo, Japan

[73] Assignee: NEC Corporation, Tokyo, Japan

[21] Appl. No.: 26,155

[22] Filed: Mar. 3, 1993

[30] Foreign Application Priority Data

Mar. 4, 1992 [JP] Japan .................. 4-082714

[51] Int. Cl.6 .............. G06F 15/40; G06F 13/00
[52] U.S. Cl. ................ 395/600; 364/DIG. 1;
   364/222.81; 364/283.1; 364/282.2; 364/261
[58] Field of Search ............ 395/600, 650, 700

[56] References Cited

U.S. PATENT DOCUMENTS

| | | | |
|---|---|---|---|
| 4,791,561 | 12/1988 | Huber | 395/600 |
| 4,819,160 | 4/1989 | Tanka et al. | 395/600 |
| 4,835,730 | 5/1989 | Shimano et al. | 364/DIG. 2 |
| 4,908,759 | 3/1990 | Alexander, Jr. et al. | 395/600 |
| 4,939,689 | 7/1990 | Davis et al. | 395/600 |

Primary Examiner—Eddie P. Chan
Attorney, Agent, or Firm—Foley & Lardner

[57] ABSTRACT

The database system includes a definition data file to store definition data for the storage units established in the database file, and loads the definition data from such definition data file to the definition data storage section, refers to the loaded definition data, and opens, updates/retrieves and closes the database file. A re-loading judgment section judges whether or not the definition data for the storage units have been changed after loading definition data to the definition data storage section and before opening of the data base file and, if the definition data have been changed, directs re-loading of the definition data.

3 Claims, 3 Drawing Sheets

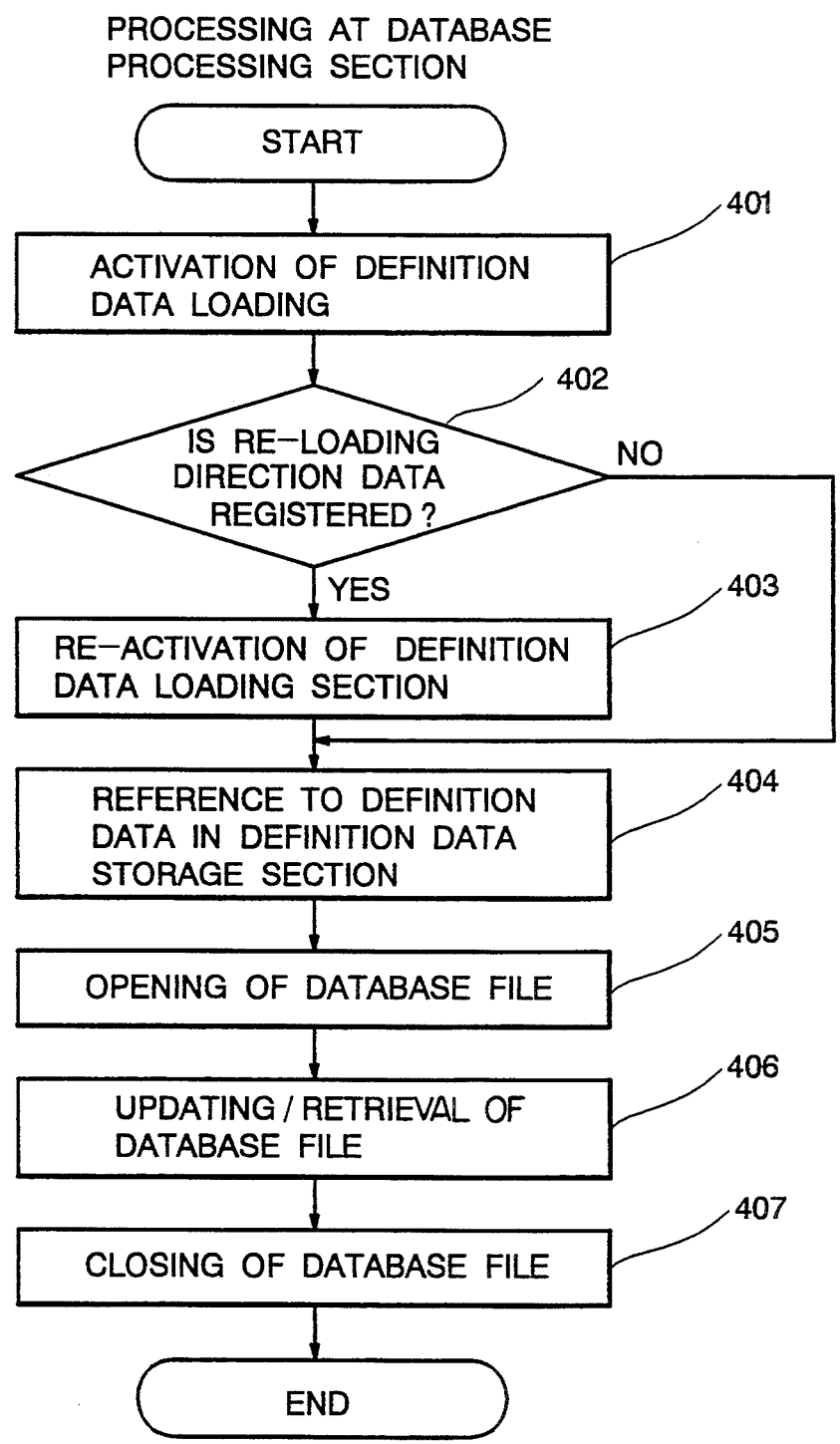

DATABASE SYSTEM WITH CONTROL FOR LOADING DEFINITION DATA FOR STORAGE UNITS

BACKGROUND OF THE INVENTION

1. Field of the Invention

The present invention relates to a database system having a database file comprising a plurality of storage units. It particularly relates to a database system characterized by its control to load the definition data for the storage units.

2. Description of the Prior Art

In a conventional database system, a database file, which is an external storage medium to store data, is divided into a plurality of areas referred to as "storage units". When utilizing a database file, storage units are established in the database file first. Upon establishment of such storage units, their sizes and locations, data attributes and the number are stored as definition data in a definition data file.

When processing for the above database file is started, the definition data for the storage units are loaded from the definition data file to a definition data storage. With reference to the definition data loaded at the definition data storage, the database system opens, updates/retrieves and closes the database file.

Such a conventional database system loads the definition data from the definition data file to the definition data storage when the database file processing starts. If storage units are reestablished (with a change in the number of storage units, for example) between the start of processing and opening of the database file and the definition data are changed, the definition data storage keeps the definition data before such reestablishment. This causes the system to open, update, retrieve and close the database file with reference to the definition data before data concerning reestablished storage units is stored in the definition data storage. In other words, the system tries to process the database file with reference to the definition data, which is different from the actual structure of storage units.

If the storage units are differently structured from the definition data referred to, the database file can be hardly opened. Even if it can be opened, it cannot be updated or retrieved properly. Further, if the database file is updated based on incorrect definition data, the database file may be destroyed in the worst case.

SUMMARY OF THE INVENTION

An object of the present invention is to provide a database system which can always process the database file based on correct definition data even when the definition data for storage units are reestablished after their loading but before opening of the database file, by means of automatic re-loading of any new definition data.

According to a preferred embodiment of the present invention to attain the above object, a database system comprises a database file provided with a plurality of storage units, a storage unit definition means to establish the storage units in the database file and to generate definition data indicating the configuration of the storage units, a definition data file to store the definition data related to the storage units, a storage means to store the definition data for the storage units loaded from the definition data file, a database processing means to load the definition data from the definition data file to the storage means and, with referring to the loaded definition data for the storage units, perform opening, updating/retrieving and closing processing of the database file, and a re-loading judgment means which judges whether the storage unit definition means has changed the definition data for storage units after loading of definition data to the storage means and before opening of the database file and, if it has, directs the database processing means to re-load the definition data.

According to a further preferred embodiment of the present invention, a database system further comprises a notification means which, each time the storage unit definition means establishes the storage units and changes the definition data, gives a notice to that effect to the re-loading judgment means, and the re-loading judgment means judges whether the definition data have been changed or not by checking for a change notice from the notification means.

According to another preferred embodiment, the re-loading judgment means judges whether the definition data have been loaded to the storage means or not upon receipt of a definition data change notice from the notification means and, if the definition data have been loaded, directs the database processing means to re-load the definition data.

According to a still preferred embodiment, a database system further comprises a re-loading data registration means where the re-loading judgment means registers the data for re-loading of the definition data, and the database processing means refers to the re-loading registration means when it refers to the definition data storage means and, if any re-loading data is found, re-loading the definition data to the storage means.

According to a further preferred embodiment, a database system further comprises a loading means to load the definition data from the definition data file to the storage means and the database processing means activates the loading means upon start of accessing to the database file or according to the re-loading direction from the re-loading judgment means.

Other objects, characteristics and effects of the present invention will be clarified in the following description in detail.

BRIEF DESCRIPTION OF THE DRAWINGS

FIG. 4 is a flowchart to illustrate the processing at a database processing means in the database system shown in FIG. 1.

DESCRIPTION OF THE PREFERRED EMBODIMENT

Referring to the attached figures, a preferred embodiment of the present invention will be described in detail below.

Figure 1:
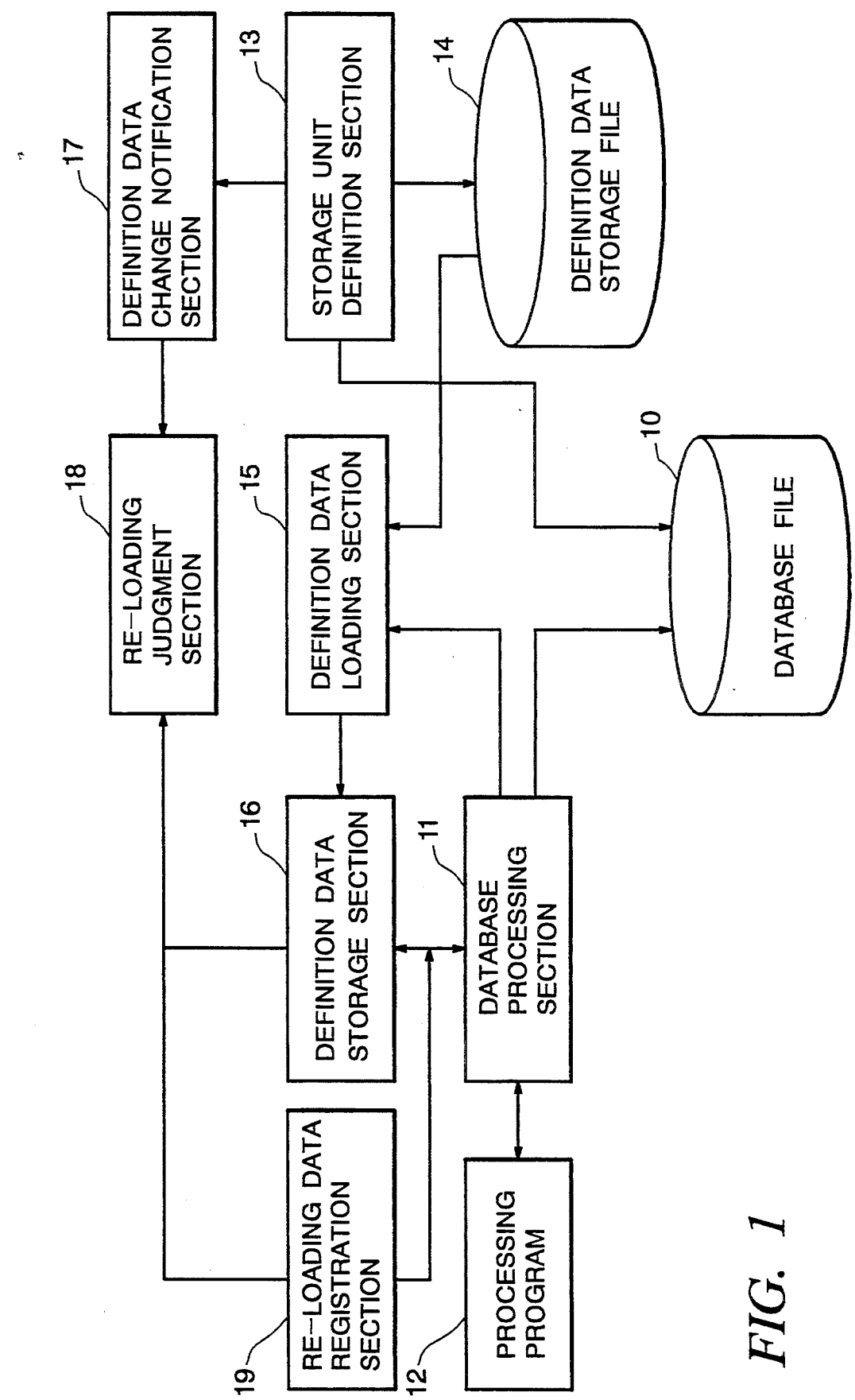
FIG. 1 is a block diagram to show the configuration of a database system according to a preferred embodiment of the present invention.

FIG. 1 shows a preferred embodiment of a database system according to the present invention. A database system of this embodiment comprises a database file 10, a database processing means 11 to control processing of the database file 10, a processing program 12 to process the database file 10 through the database processing means 11, a storage unit definition means 13, a definition data storage file 14, a definition data loading means 15, a definition data storage means 16, a definition data change notification means 17, a re-loading judgment means 18 and a re-loading data registration means 19.

Figure 2:
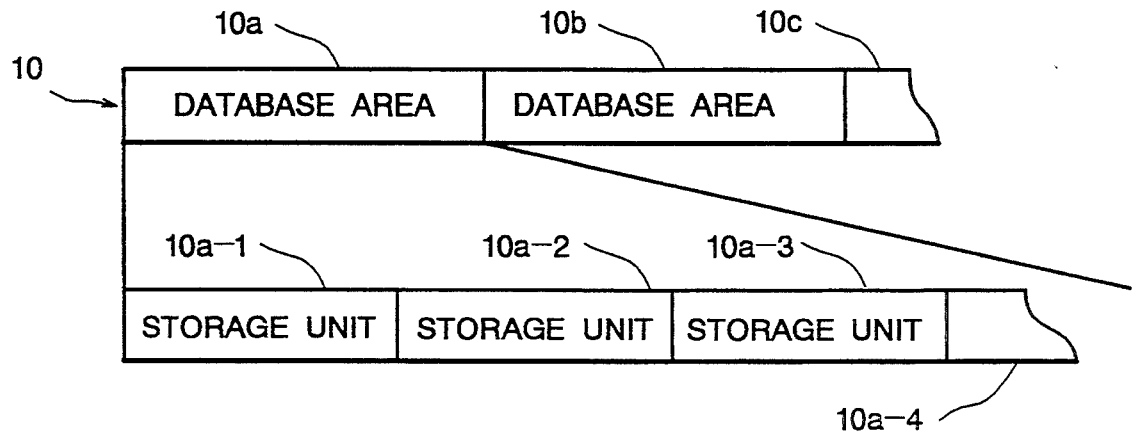
FIG. 2 is a diagram to show the structure of a database file.

The database file 10 consists of an external storage such as a magnetic disk. FIG. 2 shows the structure of such database file 10. As shown in the figure, the database file 10 has a plurality of database areas $10i$ ($i=a, b, c, \ldots$) and each database area $10i$ consists of a plurality of storage units $10i{-}j$ ($j=1, 2, 3, \ldots$). Data in the database file 10 are stored in the above storage units $10i{-}j$, and accessing to the database file 10 is controlled by the above storage units $10i{-}j$.

The database processing means 11, the storage unit definition means 13, the definition data loading means 15, the definition data change notification means 17, and re-loading judgment means 18 serve as system program functions to control the database system. The database processing means 11 controls the processing program 12 to open, update/retrieve and close the database file 10.

The storage unit definition means 13 established storage units $10i{-}j$ at a database area $10i$ in the database file 10 and stores the definition data for those established storage units $10i{-}j$ to the definition data storage file 14. The definition data for the storage units $10i{-}j$ contain the sizes of the storage units $10i{-}j$, locations and the number of the storage units in the database area $10i$ and the attributes of data stored therein.

The definition data loading means 15 loads the definition data for the storage unit $10i{-}j$ from the definition data storage file 14 according to the direction from the database processing means 11 and stores them at the definition data storage means 16. The definition data storage means 16 consists of a RAM or other memory device.

When the storage unit definition means 13 newly establishes the storage units $10i{-}j$ and changes the definition data in the definition data storage file 14, the definition data change notification means 17 notifies the re-loading judgment means 18 of the change. Such notice of definition data change activates the re-loading judgment means 18.

The re-loading judgment means 18 judges whether it is necessary to re-load the definition data from the definition data storage file 14 to the definition data storage means 16 based on whether any definition data is loaded in the definition data storage means 16 and whether any notice of definition data change is given by the definition data change notification means 17. If it judges that re-loading is necessary, it registers a re-loading data to direct re-loading at the re-loading data registration means 19. The re-loading data registration means 19 may be provided as a sole component such as a RAM or other memory device, or may be given as a part of the above definition data storage means 16.

Figure 3:
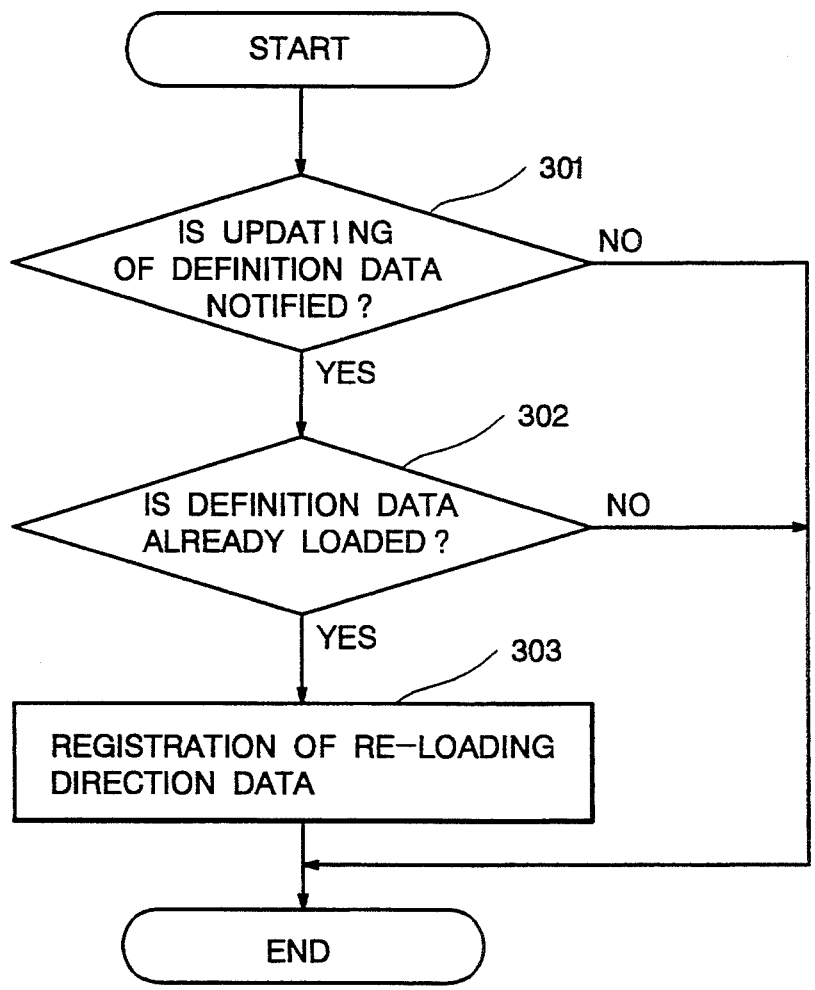
FIG. 3 is a flowchart to illustrate the processing at a re-loading judgment means in the database system shown in FIG. 1.

Next, referring to the flowcharts in FIGS. 3 and 4, the operation of the database system according to this embodiment is described. FIG. 3 is a flowchart to illustrate the processing operation at the re-loading judgment means 18 and FIG. 4 is a flowchart to illustrate the processing where an access is made to the database file 10 with using the processing program 12.

Usually, before the start of processing by the processing program 12, the storage unit definition means 13 established the storage units $10i{-}j$ in the database file 10 and at the same time stores the definition data related to those established storage units $10i{-}j$ in the definition data storage file 14. In addition, the definition data change notification means 17 gives a change notice to the re-loading judgment means 18 to notify that the definition data in the definition data storage file 14 are changed when the storage unit definition means 13 establishes the storage units $10i{-}j$ and stores their definition data.

Referring now to FIG. 3, when the re-loading judgment means 18 receives the change notice from the definition data change notification means 17 (Step 301), it judges whether the definition data for the storage units $10i{-}j$ in the database file 10 have been loaded to the definition data storage means 16 from the definition data storage file 14 by the definition data loading means 15 (Step 302). Before the start of processing by the processing program 12, any definition data have not been loaded yet, and the re-loading judgment means 18 terminates the processing.

Then, referring now to FIG. 4, when the processing program 12 of processing to the database file 10 starts processing, the database processing means 11 activates the definition data loading means 15 (Step 401). The definition data loading means 15 in turn loads the definition data stored in the definition data storage file 14 to the definition data storage means 16.

If, at this moment, the storage unit definition means 13 reestablishes the storage units $10i{-}j$ in the database file 10, it stores the definition data related to the newly established storage units $10i{-}j$ in the definition data storage file 14, and thereby changes the definition data. Upon such change, the definition data change notification means 17 gives a change notice to the re-loading judgment means 18 to the effect that the definition data in the definition data storage file 14 is changed.

Upon receipt of a definition data change notice from the definition data change notification means 17, the re-loading judgment means 18 judges whether the definition data related to the storage units $10i{-}j$ in the database file 10 have been given to the definition data storage means 16 from the definition data storage file 14 by the definition data loading means 15 (Step 302 of FIG. 3 again). Here, the definition data loading means 15 has been activated by the processing program 12 and the definition data have been already loaded to the definition data storage means 16, the re-loading judgment means 18 registers a re-loading direction data to cause re-loading of definition data to the re-loading data registration means 19 (Step 303 in FIG. 3).

Thereafter, when the database processing means 11 opens the database file 10 upon request of the processing program 12, it firstly refers to the re-loading data registration means 19 to check whether any re-loading direction data is registered or not (Step 402). As described above, if the storage unit definition means 13 has reestablished the storage units $10i{-}j$, re-loading direction data is found there. Upon finding it, the database processing means 11 reactivates the definition data loading means 15 (Step 403), and re-loads the changed definition data from the definition data storage file 14 to the definition data storage means 16. Then, the database processing means 11 refers again to the definition data in the definition data storage means 16 after re-loading (Step 404), and performs opening, updating/retrieval and closing of the database file 10 according to the definition data it referred to (Steps 405 through 407).

If the storage unit definition means 13 has not reestablished the storage units 10$i$–$j$, the re-loading direction data is not found at the re-loading data registration means 19 in Step 402. In that case, the definition data loading means 15 is not reactivated, and the system refers to the definition data firstly loaded to the definition data storage means 16 to perform opening, updating/retrieving and closing processing of the database file 10.

Thus, even if definition data related to the storage units 10$i$–$j$ are changed through reestablishment of the storage units 10$i$–$j$ after loading of the definition data for the storage units 10$i$–$j$ to the definition data storage means 16 but before opening processing of the database file 10, the definition data after the reestablishment are given to the definition data storage means 16. Therefore, the database file 10 can be always processed according to the current definition data.

Obviously, various modifications can be made to the above embodiments. It is intended to cover in the appended claims all such modifications and variations as fall within the true spirit and scope of the present invention.

What is claimed is:

1. A database system comprising:
   a database file provided with a plurality of storage units for storing data,
   a storage unit definition means for establishing said storage units in said database file and changing definition data indicating the configuration of the storage units before the start of processing of said database file,
   a definition data storage file for storing the definition data related to said storage units changed by said storage unit definition means,
   a load and storage means for loading the definition data for the storage units from said definition data storage file and storing the loaded definition data,
   a database processing means for performing opening, updating/retrieving and closing processing of said database file, with reference to the definition data for said storage units loaded by said load and storage means from said definition data storage file,
   a notification means for generating a notice of the definition data change each time said storage unit definition means establishes said storage units and changes the definition data, and
   a re-loading judgment means responsive to the notice of definition data change, for judging whether any definition data for the storage units in the database file have been loaded to said load and storage means and before opening of said database file, and outputting a re-loading direction to said database processing means and before opening of said database file for re-loading said definition data to said load and storage means when the definition data have been changed.

2. The database system of claim 1 further comprising a re-loading direction registration means for registering and generating a re-loading direction for re-loading of said definition data output from said re-loading judgment means, and wherein
   said database processing means refers to said re-loading direction registration means when it refers to said definition data storage file and, when any re-loading direction is found, directing said load and storage means to re-load the definition data from said definition data storage file.

3. The database system of claim 2, wherein said database processing means activates said load and storage means upon starting of accessing to said database file or according to the re-loading direction from said re-loading judgment means.

* * * * *